Sept. 11, 1962  K. HENRICHSEN  3,053,196
HIGH TEMPERATURE VARIABLE DISPLACEMENT PUMP
Filed Oct. 27, 1959  3 Sheets-Sheet 1

INVENTOR.
KNUT HENRICHSEN
BY
Charles F. Dischler
ATTORNEY

Sept. 11, 1962 K. HENRICHSEN 3,053,196
HIGH TEMPERATURE VARIABLE DISPLACEMENT PUMP
Filed Oct. 27, 1959 3 Sheets-Sheet 2

INVENTOR.
KNUT HENRICHSEN
BY
Charles F. Dischler
ATTORNEY

Sept. 11, 1962 K. HENRICHSEN 3,053,196
HIGH TEMPERATURE VARIABLE DISPLACEMENT PUMP
Filed Oct. 27, 1959 3 Sheets-Sheet 3

INVENTOR.
KNUT HENRICHSEN
BY
Charles F. Dinchler
ATTORNEY

United States Patent Office 3,053,196
Patented Sept. 11, 1962

3,053,196
HIGH TEMPERATURE VARIABLE
DISPLACEMENT PUMP
Knut Henrichsen, Los Angeles, Calif., assignor to
North American Aviation, Inc.
Filed Oct. 27, 1959, Ser. No. 848,946
10 Claims. (Cl. 103—161)

This application relates to pumps of the variable volume type and more particularly it relates to a constant pressure variable stroke radial pump for operation in high temperature environments and under liquid pressures of the order of thousands of pounds per square inch.

Constant pressure variable volume radial cylinder pumps have long found extensive use in aircraft hydraulic systems. With the advent of supersonic aircraft the demands made upon such pumps have very greatly increased. With the more advanced supersonic and even hypersonic aircraft now being designed, the required pump characteristics have become even more exacting and difficult of attainment. Not only are greater pressures and volumes required in order to hydraulically operate the aircraft control surfaces at such high speeds, but the temperature problem also assumes major importance. For instance, pumps in one design classification are now required to operate at pressures as high as 4,000 pounds per square inch and with fluid inlet temperatures of the order of 400° F. and higher.

The design problems attendant upon high pressures are relatively well known and their solutions susceptible of standard engineering design analyses. But the problems encountered in producing a small lightweight pump for continuous high temperature aircraft usage require unique solutions. Among the detrimental effects of such high temperatures may be an increase in leakage or the possibility of binding due to differential expansion of mating parts. Additionally, the high temperatures that are an unavoidable result of the severe conditions of such high speed flight alter the characteristics of spring-loaded control valves associated with such pumps thereby causing vibrations in the pump output pressure characteristics with an increase in temperature.

Variations in pump stroke and hence in pump volume displacement of a radial piston rotary type pump are normally accomplished by varying the eccentricity of a reaction ring or piston slipper race, which encircles and contains the pistons, relative to the axis of rotation of the cylinder block and thereby affecting piston reciprocation. In general, this reaction ring is moved to an eccentric position by some form of mechanical controlling means in opposition to which fluid pressure produced in the pump cylinders acts to reduce the eccentricity of the reaction ring, thereby reducing the effective stroke of the pistons and the pump output. In general, reaction rings known in the prior art have either been pivotally mounted or adapted to slide on trackways with the eccentricity being controlled either by leaf or coil springs or by pressure loaded pistons. Such control devices fail to provide sufficiently fast response for many applications wherein fluctuations are particularly evident such as in installations where sudden large volume demands may be made on the pump. Furthermore, such prior types of eccentricity controlling means normally require the full pump discharge pressure or a substantial portion thereof for their operation. It is because of limitations such as these that such pumps are not able to respond with sufficient rapidity to prevent excessive pressure fluctuations in the discharge when a sudden demand is made on the pump.

The above disadvantages and limitations on pumps of this type have, to a very great extent, been overcome by the floating reaction ring arrangement set forth in my copending application Serial No. 845,671, filed October 12, 1959. In that arrangement an eccentric reaction ring is provided that is fully floating but guided for a rolling motion within the pump casing whereby the reaction ring may be translated from a position of maximum eccentricity to a position concentric with the cylinder block and pistons for zero pump displacement. In that invention, the reaction ring is translatable within the pump casing by a differential low pressure acting over susbtantially the entire surface area of the diametrically opposite halves of the floating reaction ring. Sealing means contact the casing and reaction ring to form therewith opposed variable volume chambers of which one chamber will contract an amount proportionate to the expansion of the other chamber when the reaction ring is moved in the casing under the applied pressure differential. A portion of the sealing means serves as a thrust block to transmit the high piston forces to the casing and also provides a small planar surface upon which the reaction ring rolls during its translatory movement from a concentric to an eccentric position and return. To achieve the required pressure differential for actuating the piston reaction ring a low constant fluid pressure is communicated to one of the variable volume chambers, while a variable pressure, dependent on the pump discharge pressure is communicated to the other opposed chamber on the opposite side of the reaction ring. This pressure differential acts to feather or unfeather the variable displacement reaction ring, depending on whether the applied variable pressure is greater than or less than the constant applied pressure.

However, even my improved pump, as set forth in the above-mentioned copending application, like prior art pumps, has no adequate provision for maintaining constant pump discharge pressure conditions regardless of temperature fluctuations. Hydraulic design operating criteria for modern aircraft, particularly of the military type, range from a low temperature of −65° F. to an upper design temperature that is continually rising with increasing aircraft speeds. Presently, this upper temperature is in the region of 400° F. to 450° F., but temperatures much higher than this are certain to be encountered in the immediate future. Thus, to meet these conditions, any hydraulic device must be able to consistently and adequately perform its intended function while undergoing an environment temperature change over a very short time period that, at present, may vary from −65° F. to 450° F., and which in the future will be even greater. It will be understood that the term environment temperature as used herein includes the fluid temperature, the ambient temperature and any other source of thermal energy affecting the pump operating temperature by conduction, convection or radiation.

To overcome this disadvantage and to provide a substantially constant pump discharge pressure for a reaction ring type of pump and in particular for a floating reaction ring pump of the type disclosed in my above-mentioned copending application, the present invention provides, in combination with such a pump, a means for providing a variable feathering and unfeathering pressure that is substantially independent of changes in the environment operating temperature. More specifically, the means for providing a pump controlling fluid pressure that varies in accordance with the pump discharge pressure comprises elastically biased opposed fluid actuated members having differential thermal expansion characteristics and being of predetermined areas, such that changes in the elastic biasing force with temperature are compensated for by changes in the opposed fluid forces due to a differential area change of the opposed members.

Accordingly, it is an object of this invention to provide a pump that is particularly suitable for use in aircraft by reason of its extremely small envelope dimensions, its light weight, simplified design and the minimum of hardware items incorporated therein.

The pump of this invention operates at a design speed of 8,000 revolutions per minute, or higher, while producing a large volume flow rate at 4,000 pounds per square inch discharge pressure and inlet temperatures of about 400° F. Its straightforward design has resulted in a reduction to a total of no more than one-hundred twenty-seven component parts, of which but a relatively few are moving parts, to thereby insure ease of assembly and disassembly, great reliability, as well as economy in production.

It is also an object of this invention to provide a pump having means for varying the output flow while maintaining a substantially constant output pressure at any temperature of the feathering control means.

It is another object to provide a pump having a built-in temperature compensated means to provide a constant pressure discharge regardless of the operating fluid temperatures or the environment temperature in which the pump is located.

Yet, a still further object is to provide a pressure sensitive governor that is temperature compensated to provide a truly constant discharge pressure regardless of the demand on the pump and the operating temperature conditions of the pump. The unique manner in which the spring-loaded governor is compensated for changes in temperature, which cause the rate of deflection of the spring to vary, is a further feature of this invention. The novel construction of this governor, by utilizing opposed pistons, further allows the use of a smaller, lighter and more sensitive spring with its attendant advantages.

These and other objects and advantages of the present invention will become apparent to those skilled in the art after reading the present specification and the accompanying drawings forming a part thereof, in which.

Figure 1:
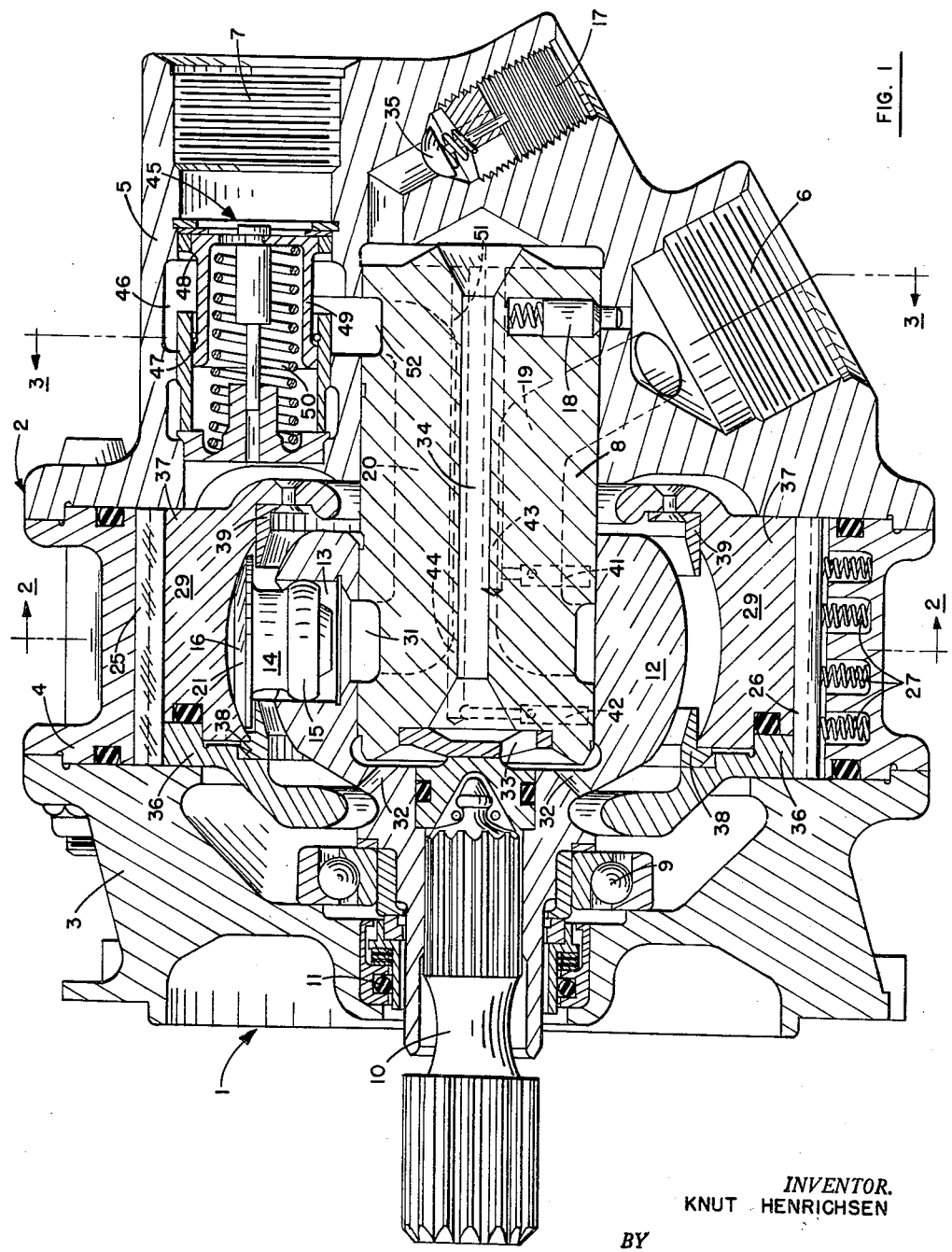
FIG. 1 is a longitudinal sectional view of the variable displacement pump of this invention taken in a medial plane thereof.
Figures 2, 6:
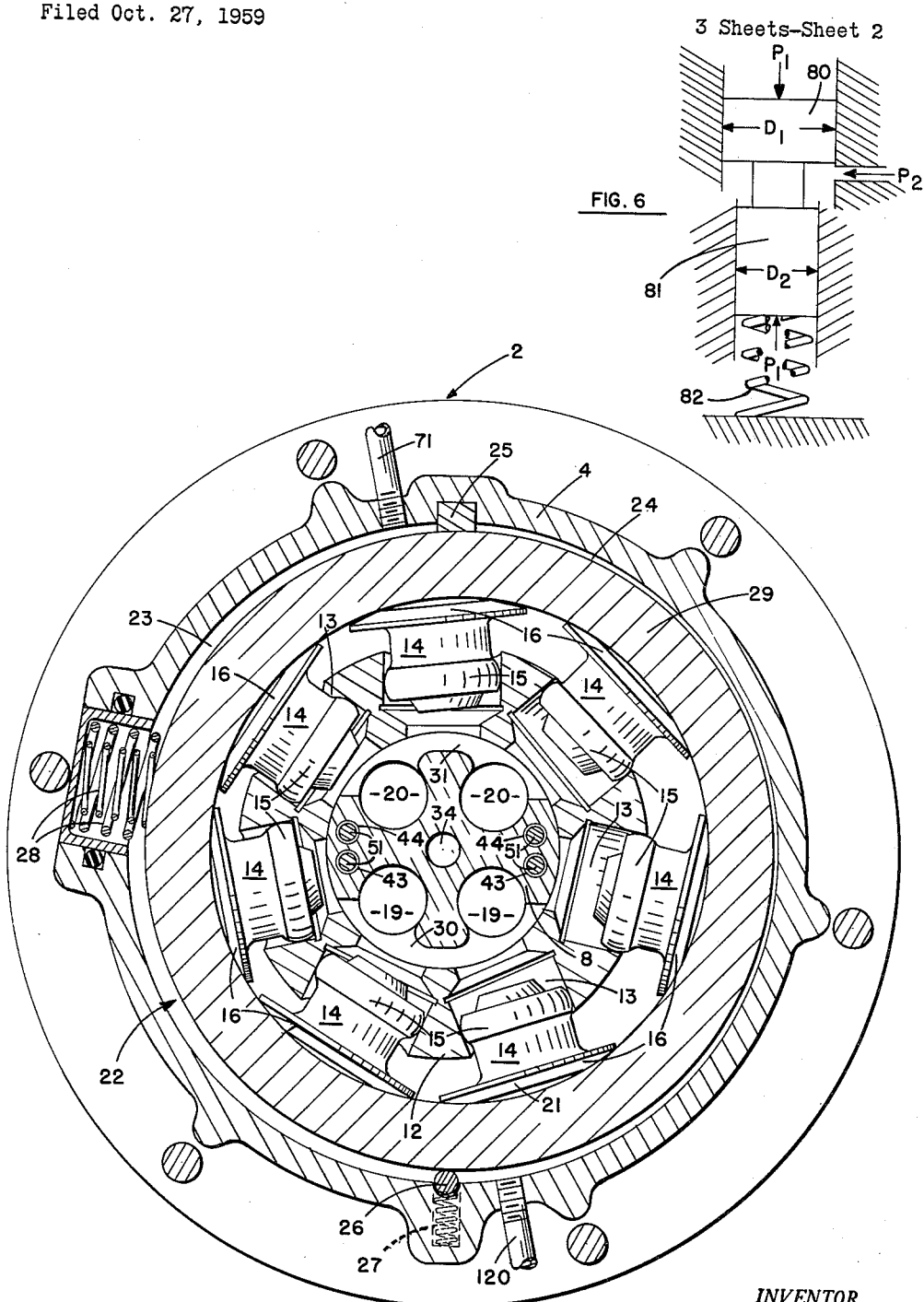
FIG. 2 is a transverse sectional view taken in the plane of line 2—2 in FIG. 1 and showing the floating slipper race in a position of maximum eccentricity.
FIG. 6 is a basic schematic representation of a spring-loaded opposed piston mechanism for effecting temperature invariant linear axial movement thereof in response to a variable applied pressure.
Figure 3:
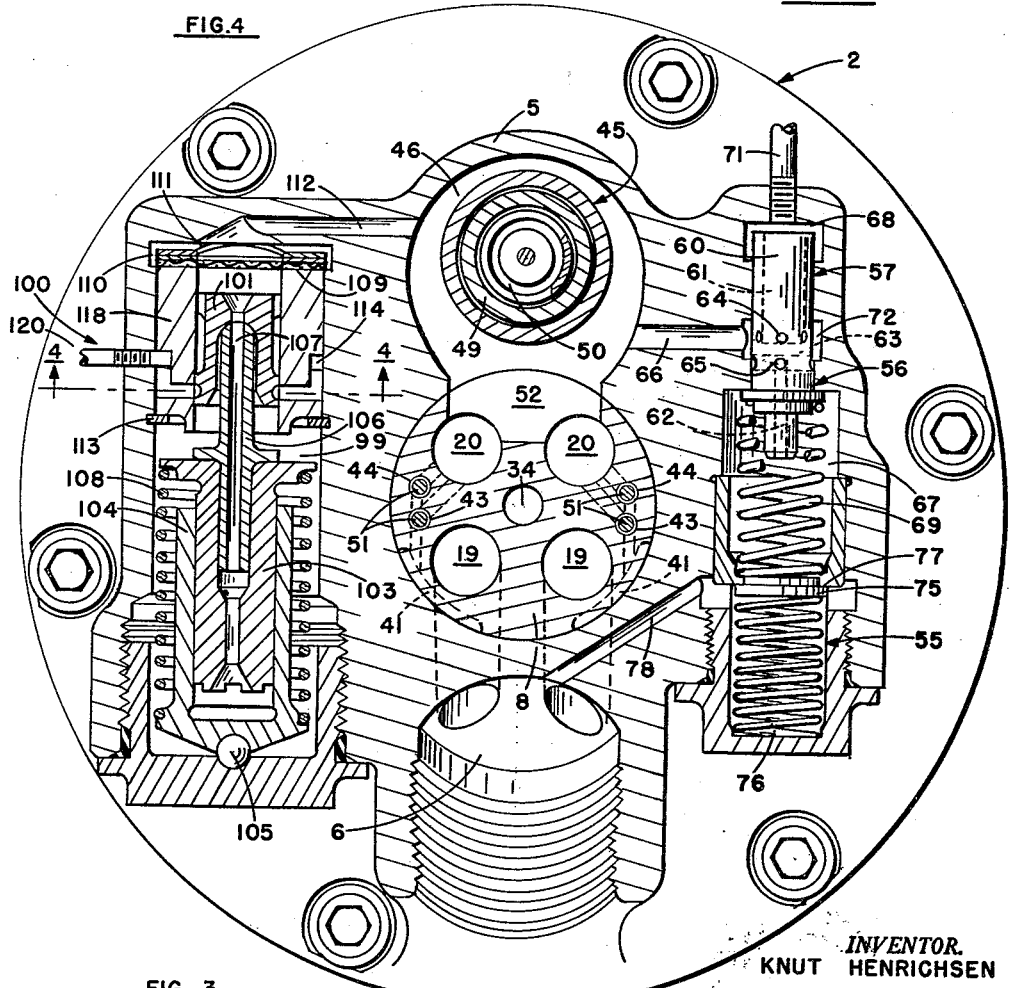
FIG. 3 is a transverse sectional view taken in the plane of line 3—3 in FIG. 1 showing the constant pressure valve and the temperature compensated governor valve for controlling the eccentricity of the reaction ring slipper race in accordance with the pump demand. The built-in purge valve and case drain bypass valve are also clearly illustrated by this figure.

Referring specifically to the drawings wherein like reference characters have been used throughout the several views to designate like parts and referring at first to FIGS. 1, 2 and 3, reference numeral 1 generally designates a pump having a casing 2 consisting of a drive end section 3, a center annular section 4 and a discharge end section 5 removably joined together in a conventional manner by through-bolts. Discharge casing section 5 has a fluid inlet port 6, fluid outlet port 7 and a casing fluid outlet port 17 extending therethrough for communication with appropriate complementary pasageways in pintle valve 8, which is removably mounted in the casing section 5 by means of a spring-loaded detent 18. The pintle valve includes openings 19 and 20 which serve as the inlet and outlet passageways, respectively, communicating with the respective inlet and outlet ports 6 and 7. The pintle valve acts as the main bearing for the pump, rotatably supporting the cylinder block 12 thereon, while anti-friction bearing 9 serves to axially support the cylinder block where splined power input shaft 10 mates with interior splines in the cylinder block for driving the same. A shaft seal 11 prevents leakage of case fluid from the "wet case" of the pump.

The cylinder block 12 is provided with a plurality of radial cylinders 13, in which piston slipper assemblies 14 reciprocate. These piston slipper assemblies are preferably of the type disclosed in my copending application Serial No. 682,981 and are so shown and described herein. Each of these assemblies includes a piston portion 15 for engagement with a cylinder, while slipper portion 16 projects beyond the cylinder block and includes a spherical outer face, having a fluid basin therein, which engages a complementary spherical slipper bearing race or reaction ring 29. For ease of manufacture and to make assembly possible, ring 29 is made in two parts, members 36 and 37, which are assembled in a manner to position and hold piston return rings 38 and 39. The reaction ring or slipper bearing race is floatingly mounted within casing annulus 4 between the opposed ends of casing sections 3 and 5. The slipper bearing race in conjunction with the casing sections thus forms a chamber 22. As best seen in FIG. 2, this chamber is divided into oppositely disposed chambers 23 and 24 by a bearing member 25 extending between the flange spaces of casing section 3 and 5 and a linear seal 26 which is biased into contact with the reaction ring by springs 27. With this arrangement, by the application of a suitable pressure differential across the reaction ring, the ring may be positioned anywhere within the range of ring movement from the limit of a "bottomed" position at the extreme right of the casing to a "bottomed" position at the extreme left of the casing. As shown in this figure, when the pressure in chamber 23 sufficiently exceeds the pressure in chamber 24, the slipper race or reaction ring is at the extreme right and the race has its maximum eccentricity with respect to the center of rotation of the cylinder block and the displacement of the pump is a maximum. Conversely, when the pressure in chamber 24 is sufficiently greater than the pressure in chamber 23, the reaction ring will be biased to the extreme left against the casing thereby bringing the axis of the ring and the cylinder block into coincidence whereby the pump pistons have a zero displacement and the pump rotates without pumping any fluid.

Springs 28 provide a positive initial eccentricity for start-up. Without such an initial eccentric biasing force, the reaction ring and cylinder block might remain in a concentric relationship. These relatively light biasing springs, however, provide sufficient initial eccentricity so that the pump is able to operate satisfactorily and within a very few revolutions of the cylinder block the discharge pressure has risen to a point sufficient to permit hydraulic control of the reaction ring.

The pressure differential acting across the reaction ring is achieved by applying a relatively low constant pressure to one side of the slipper race in chamber 23 and a variable pressure, which is dependent on the pump discharge pressure, to the other side of the race in chamber 24. The variable pressure is throttled and communicated to chamber 24 by governor 100 to be described in detail hereinbelow.

As set forth in my copending application Serial No. 682,981, filed September 9, 1957, a large resultant piston load is caused by the compression of the fluid in the piston cylinders. The resultant piston load of such pumps oscillates about a center line. This oscillating force tends to move the ring back and forth in the direction of eccentricity. As previously described, however, the immersion of the slipper reaction ring in the manner of this invention serves to reduce such oscillatory motion to a minimum.

Referring to FIGS. 1 and 2, pintle inlet and outlet passageways 19 and 20 connect the respective casing inlet and outlet ports 6 and 7 with the diametrically opposed pintle inlet and outlet ports 30 and 31, respectively. The latter extend circumferentially around portions of the lower side and the upper side of the pintle, respectively. Ports 30 and 31 are dimensioned to correspond to the diameter of the cylinder ports for cooperation therewith in the fluid pumping process. With the embodiment as shown in FIG. 2, the cylinder block rotates counterclockwise, thereby drawing fluid from inlet port 6 through passageway 19, thence into pintle inlet port 30 and from there into the cylinders on the lower half of the pintle valve. Pistons on the upper portion of the pintle valve move inwardly and force the fluid into port 31, through passage 20 and outlet port 7.

All leakage within the pump eventually flows into the case, building up enough pressure to force the leakage fluid back to the reservoir through axial return passage 34 in the pintle. The fluid will release some air into the case, and since a wet case is not only permissible but also necessary for slipper operation during the intake stroke, this air must be expelled. Leakage fluid in the pump case thus passes through ports 32 and 33 to central axial passage 34, which may be connected to the reservoir return line of a closed hydraulic system by means of case outlet port 17 which is provided with a check valve 35 to prevent return flow into the case. The case outlet is also connected to the inlet port 6 by means of a bypass valve 55 to be described hereinbelow. The axial location of pintle leakage fluid passage 34 assures that any air in the case will be immediately exhausted as the pump rotates and the denser hydraulic fluid is forced outwardly under the action of "centrifugal force."

The pump of this invention incorporates the fluid balancing features shown in my copending application, Serial No. 843,495, filed September 30, 1959. By the unique arrangement set forth therein, a predeterminately designed overbalancing force tending to urge the lower surfaces of the cylinder block and pintle into contact is balanced by a metered flow of high pressure fluid to the region between the lower surfaces of the cylinder block and pintle on either side of the inlet port 30. By this structural arrangement, both radial eccentricity and axial tilting misalignment of the cylinder block and pintle is prevented.

The structure for overcoming the pintle over-balance, and thereby insuring that a fluid film is maintained between the pintle and cylinder block at all times, is shown in FIGS. 1 and 2. The arrangement includes a pair of balance grooves 41 provided on the lower surface of the pintle between inlet port 30 and one end of the pintle. A similar pair of balance grooves 42 is located on the other side of inlet port 30. Conduits 43 and 44 interconnect high pressure outlet passages 20 with the balance grooves 41 and 42, respectively. The conduits are provided with suitable restrictions, such as metering pins 51, which hold the flow to a predetermined value depending upon the clearance in the conduits. Thus, this arrangement provides a controlled high pressure fluid force acting on the low pressure bottom area of the pintle that is sufficient to overcome the predeterminately designed and built-in overbalance on the top of the pintle to assure the maintenance of a lubricating fluid film between the cylinder block and pintle. A more detailed description of the action of this fluid balancing arrangement is provided in my above-mentioned copending application Serial No. 843,495, filed September 30, 1959. While the present embodiment is described herein as being of the overbalanced type, it could equally well be of the underbalanced type as taught in my copending application Serial No. 843,495, filed September 30, 1959 and, further, it could also incorporate a modified metering and pressure balancing groove arrangement of the type disclosed therein whereby the metering pins 51 may be eliminated.

As previously stated, the piston slipper assemblies 14 of the present pump are also of the same unique construction described in my copending application Serial No. 682,981, filed September 9, 1957. In this arrangement, the piston portion 15 has an exterior segmental spherical surface, which allows the piston to float freely and assume an angular position within the cylinder as the cylinder block rotates and the piston slipper is displaced from the axis of the cylinder by the fluid forces acting thereon. The spherical contours of the piston slipper face 21 and the bearing race, or reaction ring 29, assure that no misalignment will occur therebetween. The piston slipper assembly includes a restricted passageway therethrough whereby high pressure fluid from the interior of the piston cylinder may be applied to a basin formed in the face of the slipper to provide step bearing lubrication in the manner described in detail in my copending application. On the intake stroke and at high speeds of rotation a check valve in the piston slipper assembly prevents any reverse flow from the basin located in the slipper. Under this condition of operation the slipper of this pump operates as a dynamic fluid wedge bearing for preventing metal-to-metal contact with the slipper race.

To assure positive outward displacement of the piston slippers during the intake stroke at low speeds, piston return rings 38 and 39 are provided to guide and positively move the piston slippers outwardly on the suction stroke. These rings are only effective at low speeds when the centrifugal force may be insufficient to return the pistons to the outer end of the cylinder against the case fluid pressure.

To assure a quick build-up of pressure within the pump for supplying pressurized fluid to the fluid balancing grooves, a priority valve 45 serves to prevent any discharge from the pump below a preset pressure which, in a typical application, may be a pressure of about 2,000 pounds per square inch. Annular chamber 46 in casing end section 5 provides communication with the pintle outlet passage 20 to allow application of the pump discharge pressure to the priority valve. Annular shoulder 47 on the priority valve sleeve 49 has a larger area than shoulder 48 at the opposite end of the sleeve. Upon pump start-up, when the differential force applied to the sleeve by the discharge pressure is sufficient to overcome valve spring 50, the priority valve will open, allowing fluid to be discharged to outlet port 7.

Reference is now made to FIG. 3 for a description of the valve structure for controlling the eccentricity of the piston slipper reaction ring 29. This figure of the drawing also illustrates the purge valve 56 and bypass valve 55 utilized in this pump. Valve body 60 comprises the movable valve member for both purge valve 56 and a constant pressure valve 57. This combined valve body has axial bores 61 and 62 separated by an imperforate wall 63 with ports 64 and 65 connecting bores 61 and 62, respectively, with an annular chamber 72 that communicates by passage 66 with the priority valve chamber 46. Upon pump start-up, the air in the pump is expelled from chamber 46 through passageway 66, annular chamber 72, port 65 and bore 62 into a chamber 67 which communicates by a passage (not shown) to the case outlet port 17. As the air is expelled from the pump, fluid flows through passage 66, port 64 and bore 61 into chamber 68 above valve body 60. When the pressure acting on the valve body 60 is sufficient to overcome the biasing force of spring 69, the purge valve is closed by the valve body 60 being forced downwardly until ports 65 are no longer in registry with the annular chamber 72 surrounding the valve body. Thus, the purge valve serves to expel the air in the pump ahead of the pumped fluid and as soon as the air has been exhausted and fluid is fed to the valve above a predetermined rate of flow it closes. The built-in priority valve in the outlet port is biased to closure by spring 50 upon start-up and thus almost instantly the pressure within the pump is raised to the priority valve opening threshold level, here preferably 2,000 pounds per square inch. This pressure then activates the slipper step bearing and the pintle valve balance grooves.

Constant pressure valve 57 thus consists of spring biased valve body 60 which has ports 64 connecting passage 66 with axial bore 61 to permit application of the pump pressure to the upper surfaces of the valve body. Spring 69 preferably has a spring constant permitting maintaining a constant pressure in chamber 68 of about 150 pounds per square inch for a 3,000 p.s.i. pump output pressure and 200 p.s.i. for 4,000 p.s.i. pump output pressure. This constant pressure is transmitted through conduit 71 to reaction ring chamber 23 for controlling the ring eccentricity in conjunction with the governor valve 100.

A spring-loaded bypass valve 55 is arranged to open and permit communication between the case and the pump inlet when the case pressure exceeds the inlet pressure by a small pressure differential, preferably 10 pounds per square inch. Bypass valve 55 comprises a valve body 75 biased to closure on valve seat 77 by spring 76. When the case pressure in chamber 67 is sufficient to overcome the biasing force of spring 76, the valve will open permitting flow from the case to the inlet port 6 by means of passage 78. This arrangement limits the pump case pressure that would tend to counteract the piston return by centrifugal force and it also limits the pressure on shaft seal 11. Normally this valve will be inoperative. However, it may become operative if abnormal conditions exist, such as during low temperature starting when the case return line may be congested by very low temperature fluid of high viscosity. Conversely, if the intake line becomes congested while the return flow is unobstructed, the pressure drop from the reservoir to the pump may exceed 10 pounds per square inch and when the bypass valve opens the case pressure could drop below reservoir pressure thereby causing reversal of flow in the case fluid return line. Check valve 35 in the case fluid return line prevents this flow reversal which would be undesirable in the event the case return line terminates in an air-filled portion of the reservoir.

The primary feature of this invention resides in the combination of a pressure differential operated slipper race in conjunction with a temperature compensated governor whereby the eccentricity of the slipper race may be varied in accordance with the discharge pressure to achieve constant pump discharge characteristics regardless of the environmental temperature including that of the fluids in the pump, or of the ambient temperature in which the pump is operating. Spring members normally suffer an increase in their rate of deflection at elevated temperatures. The present feature is, therefore, concerned with compensating for an increase in spring rates of deflection with increasing temperatures, which are due to the temperature induced changes in the modulus of elasticity of the spring material.

The principle of operation of the temperature compensated governor will be explained first by reference to the schematic representation shown in FIG. 6. As illustrated therein, a first piston 80 is operatively connected to a second piston 81. Piston 80 has a diameter $D_1$ that is larger than the diameter $D_2$ of piston 81. The two pistons are of different materials with piston 80 having a thermal coefficient of expansion $\mu$, that is less than the thermal coefficient of expansion $\mu_2$ for piston 81. It has been found that forming piston 80 of steel and piston 81 of aluminum provides the necessary differential rate of expansion of the two pistons, however, any two suitably different materials may be utilized for this purpose.

The basic concept of temperature compensation for a spring-loaded axially displaceable member resides in having two pistons of different diameters in opposed relationship with the piston having the smaller diameter being spring-loaded in opposition to the larger diameter piston with both pistons being subjected to the same fluid pressure on their distal surfaces. It is, of course, essential that each piston cylinder be of the same material as its associated piston to prevent differential expansion of these members. As the rate of deflection of spring 82 increases with increasing temperature, the net biasing spring force decreases. To maintain the displacement of the movable opposed pistons as a linear function of the applied pressure, this decrease in spring force must be corrected for by increasing the area of the smaller diameter piston 81 relative to that of the larger diameter piston 80, in a manner whereby the decreased spring force is compensated for by the decrease in the differential pressure acting on the opposed piston. Stated in another way, the net piston area of the opposed pistons is caused to decrease in proportion to the increase in the spring deflection rate with increasing temperature. This result is obtained by proper proportioning of the diameters of the pistons in view of their different coefficients of expansion and of the temperature effect on the modulus of elasticity of the spring. The concept and manner in which a substantially temperature invariant pressure responsive hydraulic mechanism may be achieved for providing flow control of a variable fluid pressure is more fully set forth in my copending application Serial No. 733,408, filed May 6, 1958, now Patent No. 2,931,365.

Referring now to FIG. 3, the temperature compensated governor 100 comprises a steel piston 101 axially displaceable within a piston chamber 102 formed in steel cylinder body 118, which is mounted within a cylindrical chamber 99 by means of a retainer ring 113. Piston 101 herein acts as a valve member with valve lobe 121 movable in accordance with the pump discharge pressure, which is applied through an inlet passage 112, to provide a variable pressure to chamber 24 with which it is operatively connected by conduit 120 as described in detail below. An aluminum cylinder 104 is pivotally mounted on a ball 105 at the lower end of governor chamber 99 for automatic alignment with upper piston 101. An aluminum piston 103 is slidably mounted within aluminum cylinder 104 and is interconnected with piston 101 by means of a rigid spacer member 106 with a spring 108 biasing the piston assembly in opposition to the net pressure force applied to the two opposed pistons. Steel piston 101, the interconnecting member 106 and the aluminum piston 103, all have a connecting axial bore therein forming a passage 107 to allow communication of the high pressure fluid introduced through passageway 112 to act on the lower surface of piston 103, as well as on the upper surface of piston 101. The respective diameters of the aluminum piston 103 and steel piston 101 are proportioned relative to the spring modulus of elasticity in the manner outlined above. This allows operation of the pump and attainment of the rated capacity at all temperatures within a greatly increased temperature range. To prevent the introduction into the governor of foreign solid particles of excessive size that may be carried in the hydraulic fluid, a screen 109 is positioned at the inlet to the cylinder 102. This is held in place by means of washer 110 and a Marcel spring 111.

Figure 4:
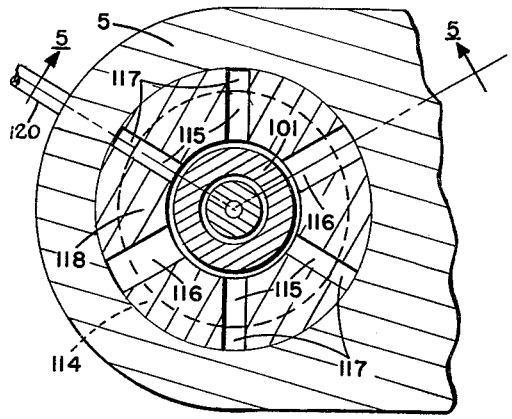
FIG. 4 is a transverse sectional view of the governor valve structure taken in the plane of line 4—4 in FIG. 3.
Figure 5:
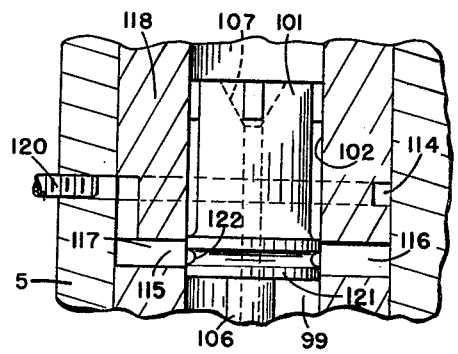
FIG. 5 is a longitudinal section through the governor valve structure taken in the planes of line 5—5 in FIG. 4.

Referring to FIGS. 4 and 5 an enlarged view is presented of the system of conduits and ports connecting the governor piston chamber 102 with slipper race ring 24 for assuring fine control and close selectivity of the quick positive response of the governor and slipper race reaction ring without hunting or oscillating of the system. As shown therein, a plurality of relatively small radially extending conduits 115 are formed in cylinder body member 118 to interconnect the cylinder chamber 102 and annular manifold chamber 114 by vertical passages 117 at their outer end. A lesser number of somewhat larger radially extending conduits 116 are also positioned within cylinder body 118 but do not communicate directly with the annular chamber 114. These latter conduits, however, do connect with conduit 115 by means of an annular groove 122 in the valve lobe 121 during a portion of the valve travel. Conduits 116 are a few thousandths of an inch greater in their vertical extent about a common transverse center plane than conduits 115. For the sake of clarity, this is shown on an exaggerated scale in FIG. 5. This arrangement provides an attenuation of the governor valve action by providing a restrictive throttling action at each end of the valve opening and closing stroke movement. Thus, as the valve moves downward under the action of increased discharge pressure, the valve lobe first uncovers radial conduits 116. The fluid then flows through the restricted annular groove 122 into conduits 115, 117, chamber 114 and thence to reaction ring chamber 24. Continued downward piston travel uncovers conduits 115 and allows a greatly increased rate of flow to be communicated to the reaction ring chamber 24. Upon upward movement of the valve, a flow reversal takes place with fluid from reaction ring chamber 24 flowing through conduit 120, chamber 114 and conduits 117 and 115 and thence into governor chamber 99, which connects with the case outlet fluid line by a conduit not shown. A similar attenuation of the flow then takes place as valve lobe 121 covers conduit 115 with conduit 116 still being in communication with chamber 24 by means of groove 122 and permitting a restricted flow therethrough and thence into chamber 99 for the last few thousandths of an inch of downward valve travel. This valve structure provides a sharp cut-off characteristic of 50 p.s.i. maximum.

It will be seen by this description that return flow from chamber 24 as the reaction ring is biased to maximum eccentricity communicates with the pump casing return line by means of governor chamber 99 which is connected to the case return line by a conduit not shown. Similarly, it will be evident from the description of the constant pressure valve 57 that when the reaction ring is moved toward a concentric position by means of a high variable pressure from the governor in response to a lessening in pump demand, relief of the constant pressure from chamber 23 will result from downward movement of valve body 60 against biasing spring 69 whence the excess fluid in chamber 23 may flow into spring chamber 67 which similarly connects with the case return line by a conduit that is not shown on the drawing.

While a particular embodiment of this invention has been illustrated and described herein, it will be apparent that various changes and modifications may be made in the construction and arrangement of the various parts without departing from the spirit and scope of this invention in its broader aspects, or as defined in the following claims.

I claim:

1. A constant pressure variable displacement hydraulic device comprising a casing having inlet and outlet ports; a cylinder block having cylinder chambers rotatably mounted in said casing; piston means reciprocable in the chambers of said cylinder block; valve means providing communication between said cylinder chambers and said inlet and outlet ports as the cylinder block is rotated; piston reaction ring means in said casing cooperating therewith to form opposed chambers, said reaction ring being operatively contacted by said piston means and being continuously eccentrically adjustable relative to said cylinder block to vary the displacement of said piston means; and temperature compensated means for supplying a fluid pressure differential across said reaction ring means that is substantially independent of temperature changes to vary the eccentricity of said reaction ring means, said fluid pressure supplying means varying in accordance with the device discharge pressure and being substantially temperature invariant whereby the discharge pressure may be maintained substantially constant at a preselected value regardless of changes in the displacement of the device or the environmental temperature.

2. A constant pressure variable displacement hydraulic device comprising a casing having inlet and outlet ports; a cylinder block having cylinder chambers rotatably mounted in said casing; piston means reciprocable in the chambers of said cylinder block; valve means providing communication between said cylinder chambers and said inlet and outlet ports as the cylinder block is rotated; piston reaction ring means in said casing cooperating therewith to form opposed chambers, said reaction ring being operatively contacted by said piston means and being continuously eccentrically adjustable relative to said cylinder block to vary the displacement of said piston means; and means for supplying fluid pressure differential across said reaction ring means to vary the eccentricity of said reaction ring means, said fluid pressure supplying means varying in accordance with the device discharge pressure and being substantially temperature invariant, said variable pressure supplying means comprising spring biased differentially expandible members providing substantially temperature invariant metering of the fluid pressure applied to said reaction ring means whereby the discharge pressure may be maintained substantially constant at a preselected value regardless of changes in the displacement of the device or the environmental temperature.

3. A constant pressure variable displacement hydraulic device comprising a casing having inlet and outlet ports; a cylinder block having cylinder chambers rotatably mounted in said casing; piston means reciprocable in the chambers of said cylinder block; valve means providing communication between said cylinder chambers and said inlet and outlet ports as the cylinder block is rotated; piston reaction ring means in said casing cooperating therewith to form opposed chambers, said reaction ring being operatively contacted by said piston means and being continuously eccentrically adjustable relative to said cylinder block to vary the displacement of said piston means; and means for supplying a fluid pressure differential across said reaction ring means to vary the eccentricity of said reaction ring means, said fluid pressure supplying means varying proportionally with the device discharge pressure and including a spring biased valve assembly having opposed pistons of materials having different coefficients of expansion dimensioned to provide a change in the net reactive piston area, with a change in temperature, that is directly proportional to the change in the spring biasing force resulting from changes in the spring modulus of elasticity with such a change in temperature whereby the pressure differential across said reaction ring will be substantially independent of temperature and the discharge pressure may be maintained substantially constant at a preselected value regardless of changes in the displacement of the device or in the temperature of the working fluid.

4. A constant pressure variable displacement hydraulic device comprising a casing having inlet and outlet ports; a cylinder block having cylinder chambers rotatably mounted in said casing; piston means reciprocable in the chambers of said cylinder block; valve means providing communication between said cylinder chambers and said inlet and outlet ports as the cylinder block is rotated; piston reaction ring means in said casing cooperating therewith to form opposed chambers, said reaction ring being operatively contacted by said piston means and being continuously eccentrically adjustable relative to said cylinder block to vary the displacement of said piston means; and means for supplying a fluid pressure differential across said reaction ring means to vary the eccentricity of said reaction ring means, said fluid pressure supplying means varying in accordance with the device discharge pressure and being substantially temperature invariant, said variable fluid pressure supplying means comprising in combination and opposed piston means, means having a temperature sensitive modulus of elasticity biasing said piston means in a direction opposite to the effective hydraulic force of the applied fluid pressure on said piston means, said piston means being proportioned and comprised of differently expandable materials whereby the net fluid force acting thereon varies with temperature changes in a manner proportional to the variation in the biasing means force resulting from changes in the modulus of elasticity of said biasing means whereby the discharge pressure may be maintained substantially constant at a preselected value regardless of changes in the displacement of the device or in the temperature of the working medium.

5. A constant pressure variable displacement hydraulic device comprising a casing having inlet and outlet ports; a cylinder block having cylinder chambers rotatably mounted in said casing; piston means reciprocable in the chambers of said cylinder block; valve means providing communication between said cylinder chambers and said inlet and outlet ports as the cylinder block is rotated; piston reaction ring means in said casing cooperating therewith to form opposed chambers, said reaction ring being operatively contacted by said piston means and being continuously eccentrically adjustable relative to said cylinder block to vary the displacement of said piston means; and means for supplying a fluid pressure differential across said reaction ring means to vary the eccentricity of said reaction ring means, said fluid pressure supplying means varying in accordance with the device discharge pressure and being substantially temperature invariant, said fluid pressure supplying means comprising a first piston and cylinder assembly of materials having substantially a same first thermal coefficient of expansion, a second piston and cylinder assembly of materials having substantially a same second thermal coefficient of expansion, said first and second pistons being in opposed relationship, spring means having a temperature variable modulus of elasticity biasing said pistons unidirectionally in opposition to the effective force of an applied fluid pressure on said pistons, said piston means being dimensioned to provide under an applied fluid pressure a net force in opposition to said spring force whereby the ratio of said applied net piston force and said spring force is substantially a temperature invariant constant and the discharge pressure may be maintained substantially constant at a preselected value regardless of changes in the displacement of the device or the environmental temperature.

6. A constant pressure variable volume hydraulic assembly for operation in a high temperature environment comprising a casing having an inlet and an outlet port; a cylinder block rotatably mounted in said casing and having radial cylinder chambers therein; piston means reciprocable in the chambers of said cylinder block; pintle valve means providing sequential communication between said cylinder chambers and said inlet and outlet ports as the cylinder block is rotated; a fully floating slipper race within said housing that may be eccentrically displaced relative to the cylinder block, said slipper race being operatively contacted by said piston means for effecting reciprocation of the pistons; means contacting said slipper race and said casing and forming therewith opposed chambers while mounting said reaction ring for rolling movement into and out of said chambers; means communicating with said outlet port to substantially supply constant pressure fluid to one of said fluid receiving chambers at a pressure substantially less than the device discharge pressure; and temperature compensated means for communicating a variable fluid pressure to said other chamber that is substantially proportional to the discharge pressure and independent of temperature to provide a pressure differential across the slipper race whereby the same is eccentrically displaced relative to said casing and said cylinder block an amount proportional to the discharge pressure and the discharge pressure may be maintained substantially constant at a preselected value regardless of changes in the displacement of the device or the environmental temperature.

7. A constant high pressure variable displacement hydraulic assembly for operation in a high temperature environment comprising a casing having an inlet and outlet port; a cylinder block rotatably mounted in said casing and having radial cylinder chambers; piston means reciprocable in the chambers of said cylinder block; pintle valve means providing sequential communication between said cylinder chambers and said inlet and outlet ports as the cylinder block is rotated; a piston slipper race operatively contacted by said piston means and movably mounted within said casing for floating movement to and from a position eccentric to the cylinder block for effecting reciprocation of the pistons upon rotation of said cylinder block; means forming diametrically opposed chambers exteriorly of said slipper race for reception of pressurized fluid, said slipper race being guided for rolling translational movement by said chamber forming means; means communicating constant fluid pressure to one of said fluid receiving chambers; and a temperature compensated means communicating a variable fluid pressure that is independent of the environment temperature and is proportional to the discharge pressure to said other chamber to provide a pressure differential across the slipper race to thereby eccentrically displace the same relative to said casing and to said cylinder block and to maintain the discharge pressure substantially constant at a preselected value with changing temperature or output quantity.

8. A constant pressure variable displacement radial hydraulic device for high temperature operation comprising a casing having inlet and outlet ports; a cylinder block having radial cylinder chambers rotatably mounted in said casing; piston means reciprocable in the chambers of the said cylinder block; pintle valve means within said casing rotatably mounting the cylinder block and providing sequential communication between said cylinder chambers and the inlet and outlet ports upon rotation of the cylinder block; a reaction ring operatively contacted by said piston means and movably positioned within said casing for eccentric movement relative to the cylinder block for effecting reciprocation of the pistons upon rotation of said cylinder block; means contacting said reaction ring and said casing and forming therewith expansible chambers whereby a pressure differential may be applied to said chambers to cause a contraction of one chamber and expansion of another chamber to thereby alter the eccentricity of said reaction ring; a first means communicating with said outlet port to supply substantially constant fluid pressure to one of said fluid receiving chambers at a pressure substantially less than the device discharge pressure; and a second means communicating with said outlet port and supplying a variable fluid pressure to another of said chambers to provide a pressure differential across the reaction ring to thereby eccentrically displace the same relative to said casing and said cylinder block, said variable pressure supplying means including a temperature compensated valve means for metering the fluid to said other chamber and maintaining the variable fluid pressure communicated thereto proportional to the device discharge pressure and substantially independent of the environment and fluid temperature whereby the discharge pressure is maintained substantially constant despite fluctuations in temperature or capacity.

9. A constant pressure variable displacement radial hydraulic device for operation in a high temperature environment comprising a casing having inlet and outlet ports; a cylinder block having radial cylinder chambers rotatably mounted in said casing; piston means reciprocable in the chambers of said cylinder block; a pintle valve means within said casing rotatably mounting said cylinder block and providing sequential communication between said cylinder chambers and the inlet and outlet ports upon rotation of the cylinder block; a slipper race ring operatively contacted by said piston means and mounted for guided floating movement within said casing in the direction of the plane of rotation of said cylinder block to thereby vary the eccentricity of said slipper race ring relative to said cylinder block assembly so as to vary the piston stroke; means contacting said slipper race ring and casing at each of two substantially diametrically opposed locations, said contacting means permitting the slipper race ring to float within the casing and to be rotatably translatable within said casing thereby forming two opposed variable volume fluid receiving chambers in the casing; means supplying substantially constant fluid pressure to one of said fluid receiving chambers at a pressure substantially less than the device discharge pressure; and a valve means supplying a variable fluid pressure proportional to the discharge pressure and substantially independent of environment and fluid temperature to said other chamber to provide a pressure differential across the slipper race ring to thereby eccentrically displace the same relative to said casing and said cylinder block, said valve means comprising a spring baised piston assembly temperature compensated to provide a discharge pressure independent of operating temperature differentials whereby the discharge pressure is maintained substantially constant despite fluctuations of temperature or capacity.

10. A constant pressure variable displacement hydraulic device comprising a casing having inlet and outlet ports; a cylinder block having cylinder chambers rotatably mounted in said casing; piston means reciprocable in the chambers of said cylinder block; valve means providing communication between said cylinder chambers and said inlet and outlet ports as the cylinder block is rotated; piston reaction ring means operatively contacted by said piston means immersed in fluid within said casing and forming with said casing opposed chambers; and a second valve means for applying a fluid pressure differential across said reaction ring means to vary the eccentricity of the same, said second valve means including a constant pressure valve communicating with the hydraulic device outlet and one of said chambers and further including a substantially temperature invariant governor valve communicating with the device outlet and the other of said chambers for supplying a variable fluid pressure thereto and comprising a spring-biased opposed piston means in operative contact with the discharge fluid pressure, said piston means being comprised of materials having different coefficients of thermal expansion and being dimensioned to provide a net piston force that varies directly with the variation in the biasing spring force due to temperature changes in the spring modulus of elasticity thereby providing a temperature invariant governor valve whereby the discharge pressure is maintained substantially constant despite fluctuations in temperature or capacity.

References Cited in the file of this patent
UNITED STATES PATENTS

| | | |
|---|---|---|
| 1,974,961 | Johnson | Sept. 25, 1934 |
| 2,433,484 | Roth | Dec. 30, 1947 |
| 2,509,256 | Sorensen | May 30, 1950 |
| 2,566,418 | Horton | Sept. 4, 1951 |
| 2,635,551 | De Lancey | Apr. 21, 1953 |
| 2,673,526 | Horton | Mar. 30, 1954 |
| 2,680,412 | Entwistle | June 8, 1954 |
| 2,702,044 | Johnston | Feb. 15, 1955 |
| 2,724,339 | O'Conner et al. | Nov. 22, 1955 |
| 2,855,858 | Larsen et al. | Oct. 14, 1958 |
| 2,875,699 | Herndon | Mar. 3, 1959 |

FOREIGN PATENTS

| | | |
|---|---|---|
| 537,616 | Italy | Jan. 2, 1956 |